United States Patent [19]

Garver et al.

[11] Patent Number: 5,067,622
[45] Date of Patent: Nov. 26, 1991

[54] PET CONTAINER FOR HOT FILLED APPLICATIONS

[75] Inventors: Lawrence E. Garver; Gregory L. Kimbrough, both of Columbia, S.C.

[73] Assignee: Van Dorn Company, Cleveland, Ohio

[21] Appl. No.: 591,090

[22] Filed: Oct. 1, 1990

Related U.S. Application Data

[60] Division of Ser. No. 435,688, Nov. 13, 1989, which is a continuation-in-part of Ser. No. 310,779, Feb. 14, 1989, abandoned, which is a continuation-in-part of Ser. No. 269,881, Nov. 10, 1988, abandoned, which is a continuation-in-part of Ser. No. 2,165, Jan. 12, 1987, abandoned.

[51] Int. Cl.$^5$ ............ B65D 1/02; B65D 1/42; B65D 23/00
[52] U.S. Cl. ............ 215/1 C; 220/672; 220/675
[58] Field of Search ............ 215/1 C; 220/672, 666, 220/675

[56] References Cited

U.S. PATENT DOCUMENTS

| D. 112,798 | 1/1939 | Watson . | |
|---|---|---|---|
| D. 123,621 | 11/1940 | Floyd . | |
| D. 269,500 | 6/1983 | Bit | D9/350 |
| 2,780,378 | 2/1957 | Roman | 215/11 |
| 3,163,544 | 12/1964 | Valyi | 99/171 |
| 3,185,353 | 5/1965 | Mercier | 222/206 |
| 3,327,887 | 6/1967 | Chalmers | 220/31 |
| 3,596,315 | 8/1969 | Yoshikawa et al. | 18/5 BT |
| 3,963,404 | 6/1976 | Pollock et al. | 425/326 B |
| 3,986,807 | 10/1976 | Takeagami et al. | 425/307 |
| 4,011,039 | 3/1977 | Oas et al. | 425/397 |
| 4,106,886 | 8/1978 | Sokolow | 425/526 |
| 4,110,395 | 8/1978 | Akutin et al. | 264/210 R |
| 4,141,680 | 2/1979 | Kaufman et al. | 425/529 |
| 4,145,392 | 3/1979 | Valyi | 264/513 |
| 4,151,248 | 4/1979 | Valyi | 264/513 |
| 4,223,128 | 9/1980 | Halek et al. | 528/481 |
| 4,233,022 | 11/1980 | Brady et al. | 425/525 |
| 4,318,882 | 3/1982 | Agrawal et al. | 264/521 |
| 4,372,910 | 2/1983 | Stroup et al. | 264/532 |
| 4,379,099 | 4/1983 | Ota et al. | 264/25 |
| 4,382,905 | 5/1983 | Valyi | 264/520 |
| 4,385,089 | 5/1983 | Boonebat et al. | 428/35 |
| 4,421,711 | 12/1983 | Bonnebat | 264/529 |
| 4,467,929 | 8/1984 | Jacobsen et al. | 215/1 C |
| 4,473,515 | 9/1984 | Ryder | 264/28 |
| 4,476,084 | 10/1984 | Takada et al. | 264/342 R |
| 4,496,064 | 1/1985 | Beck et al. | 215/1 C |
| 4,497,855 | 2/1985 | Agrawal et al. | 428/35 |
| 4,540,544 | 9/1985 | Jakobsen et al. | 264/532 |
| 4,550,043 | 10/1985 | Beck | 428/36 |
| 4,603,066 | 7/1986 | Jabarin | 428/35 |
| 4,610,366 | 9/1986 | Estes et al. | 215/1 C |
| 4,618,515 | 10/1986 | Collette et al. | 428/35 |
| 4,665,682 | 5/1987 | Kerins et al. | 53/452 |
| 4,805,788 | 2/1989 | Akiho | 215/1 C |
| 4,818,575 | 4/1989 | Hirata et al. | 215/1 C X |
| 4,863,046 | 9/1989 | Collette et al. | 215/1 C |
| 4,877,141 | 10/1989 | Hayashi et al. | 215/1 C |
| 4,880,675 | 11/1989 | Mehta | 215/1 C X |
| 4,946,053 | 8/1990 | Conrad | 215/1 C |

FOREIGN PATENT DOCUMENTS

| 58-112949 | 7/1923 | Japan . | |
|---|---|---|---|
| 54-30654 | 2/1979 | Japan | 215/1 C |
| 55-73516 | 6/1980 | Japan . | |
| 8100501 | 11/1981 | PCT Int'l Appl. . | |
| 2218395 | 11/1989 | United Kingdom | 215/1 C |

OTHER PUBLICATIONS

Article entitled, "Van Dorn is Poised to Enter Juice Market", published on pp. 106-108 of Packaging Digest, Mar. 1989 issue.

Primary Examiner—Sue A. Weaver
Attorney, Agent, or Firm—Body, Vickers & Daniels

[57] ABSTRACT

An improved PET container is disclosed which is expressly configured for hot fill applications. The container's body side wall is rigidized against radical and longitudinal vacuum distribution so that paper labels can be applied to the container. In addition, the amorphous threaded mouth of the container is rigidized by gussets molded into the container at the junction of the mouth and body portion of the container to resist deformation when the container is capped. Finally, a bulbous vacuum deformation area in the container is provided adjacent the container mouth.

8 Claims, 5 Drawing Sheets

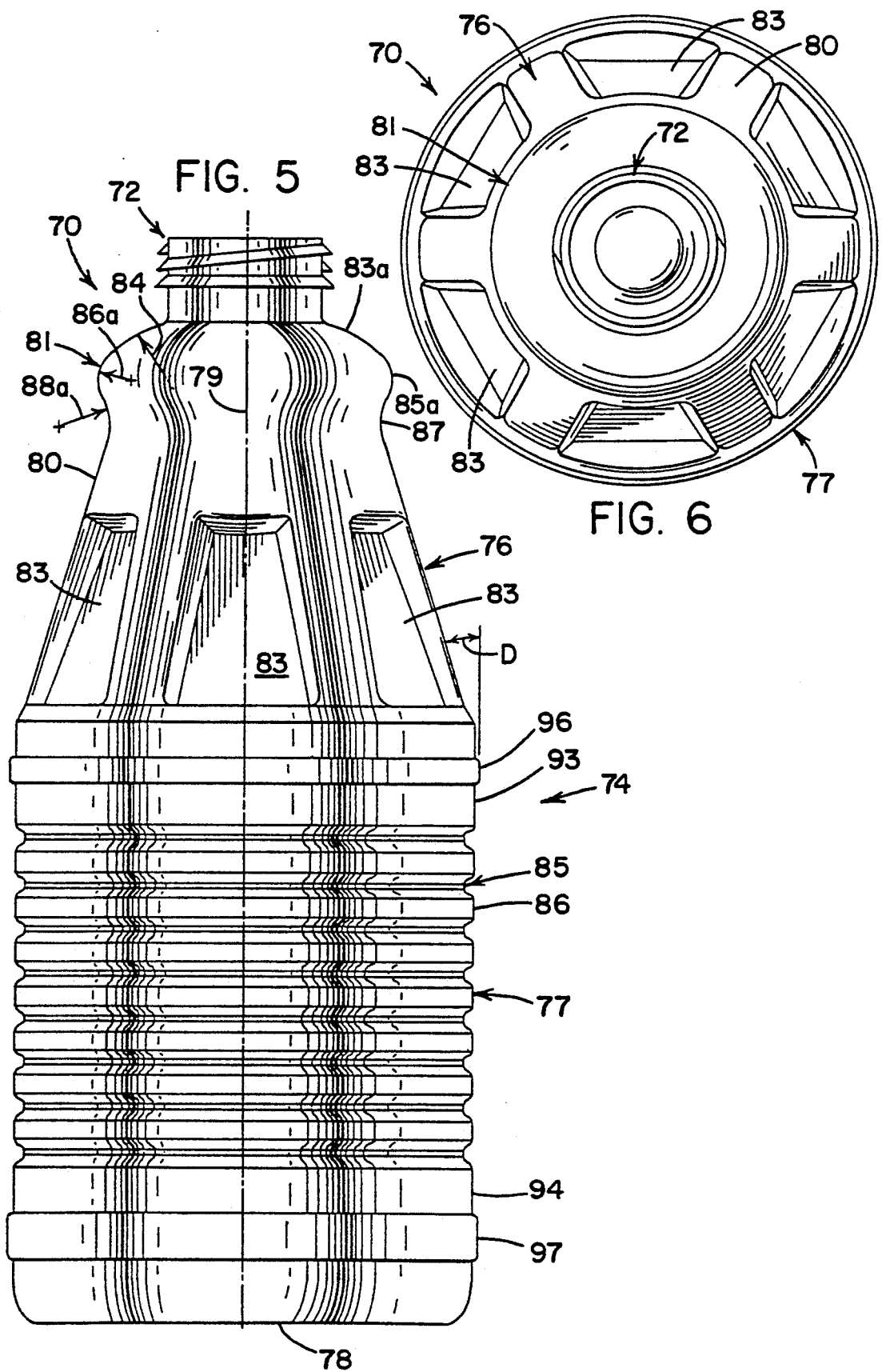

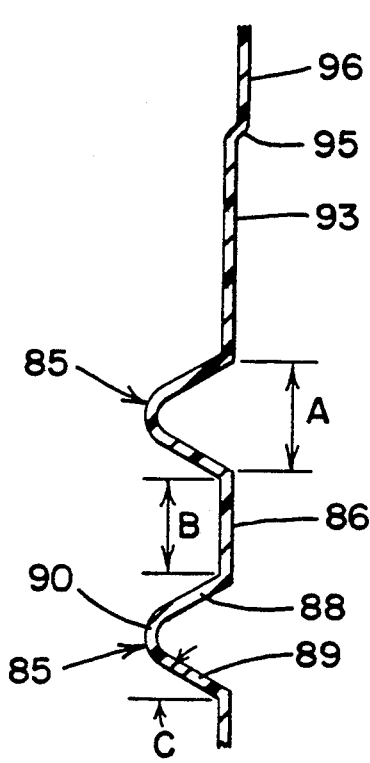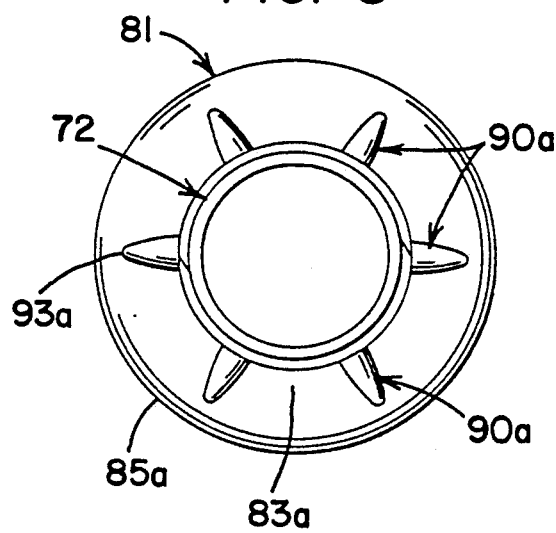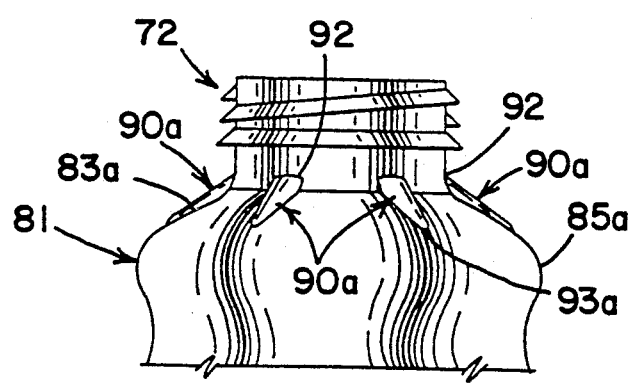

PET CONTAINER FOR HOT FILLED APPLICATIONS

This invention relates generally to PET containers and, more particularly, to a system, method and apparatus for PET containers which are subject to hot fill applications.

The invention is particularly applicable to method, apparatus and system for PET containers with small, threaded mouths which are hot filled, capped and labelled on existing or conventional bottling lines and will be described with particular reference thereto. However, it will be appreciated by those skilled in the art that the invention may have broader application and certain features or characteristics thereof are applicable to PET containers of any configuration and even PET containers which are not hot filled.

INCORPORATION BY REFERENCE

The following are incorporated by reference herein and made a part and parcel hereof:

1) *Packaging Digest* article entitled "Van Dorn is poised to enter juice market" appearing at pages 106–108 of the March 1989 issue;
2) U.S. Ser. No. 310,779 and 002,165 identified above; and
3) Stroup U.S. Pat. No. 4,372,910.

BACKGROUND OF THE INVENTION

A) General Concerns

PET containers subjected to hot fill applications must address two fundamental concerns which are not present in conventional PET container applications. The primary concern arises because liquid food products must be poured and sealed in a container at an elevated temperature high enough to destroy bacteria, microorganisms and the like to sustain food purity. The thin side walls of conventional PET containers thermally distort or collapse at hot fill temperatures. Assuming that a PET container can be formed in a configuration which will maintain its shape at the hot fill temperature, i.e. "thermally stable", the container is then subjected to a vacuum which is inherently drawn within the sealed or capped container when hot food products cool and contract. The container has to either withstand the vacuum or collapse in a shape retaining manner. For this reason and until relatively recently, rigid containers, such as glass, have been used in hot food applications.

From theoretical considerations, it is known that thermal stability of a PET container can be increased if the crystallinity of the material is increased. It is also known that thermal crystallization of amorphous PET is a time-temperature relationship and that, given a sufficient time period at elevated temperatures, amorphous PET will develop spherulitic crystallization which is opaque and brittle. It is also known if the molecular PET string is aligned or molecularly oriented by stretch blowing at preferred temperatures, crystallinity of the molecularly oriented PET can also be increased at increased temperature, but the crystallite structure will not be opaque nor excessively brittle. These concepts are the basis for all processes which produce PET containers for hot fill applications.

B) Thermally Stabilized, PET Prior Art

Until the present invention, hot fill applications using PET containers have been commercially practiced in accordance with one of two processes. The first process, developed by Monsanto and commercially produced today by Johnson's Control is basically disclosed in Agrawal U.S. Pat. No. 4,497,855. In the Monsanto process, a PET preform is heated to its preferred orientation temperature which is generally within the range of 195° F. to about 205° F. and the preform is blow molded into the desired container configuration in the normal manner. As Agrawal notes, blow molding of a PET preform raised to its preferred orientation temperature in a cold mold will produce a container having a crystallinity of about 20 to about 28%. To increase crystallinity, the container is transferred to a hot mold which is maintained at temperature ranges of anywhere from about 240° F. to about 400° F. and preferably from about 240° F. to about 270° F. and at this temperature, held for a sufficient time period, the crystallinity increases to a range of about 28% to about 32%. At that crystallinity range, Agrawal teaches that a container with acceptable thermal distortion, i.e. less than about 1% for hot fill liquids at temperatures of up to about 185° F. will result and that the bottle will be clear. This "heat treatment" step will hereafter be referred to herein as "heat set". As noted, PET containers produced in accordance with the Monsanto or Johnson Controls process are acceptable but the process requires a separate heat set step.

There are, of course, numerous variations of the heat set step in the literature. For example, U.S. Pat. No. 4,385,089 to Bonnebat discloses a partial heat step in which preform is blown at its preferred molecular orient temperature into contact with a cold blow mold which blow mold is then raised in temperature of about 40° C. to effect a partial thermofixing of the heated material after which the mold is cooled and the article removed.

An alternative process which has also gained commercial acceptance is marketed by Continental PET Technologies, Inc. and is discussed in the literature in Collette U.S. Pat. No. 4,618,515; Karins U.S. Pat. No. 4,665,682 and Beck U.S. Pat. No. 4,496,064. What is disclosed in the aforementioned patents is a thermally stable container having, generally speaking, a wide mouth so that the mouth or the neck portion of the container, as well as the body portion, is molecularly oriented under conditions which produce sufficiently high crystallinity percentages to be thermally stable. This avoids the heat set step. In the listed patents, the neck or the mouth of the container has to be molecularly or biaxially orientated to eliminate amorphous regions and in order for this to be accomplished an intermediate article has to be first formed with the amorphous end of the preform subsequently discarded. When the mouth of the container is of such a size that it cannot have a high degree of biaxial orientation, Collette then teaches to increase the temperature of the preform at the mouth to a point whereat spherulitic crystallization occurs to achieve a high enough crystallinity level to avoid temperature deformation. The spherulitic crystallization, of course, produces opacity. Thus, Continental's process, especially suitable for wide mouth containers, eliminates a heat set step but produces an intermediate formed article which requires a portion of the preform to be severed from the container and re-melted.

Thus, both processes involve additional steps which are costly and time consuming. Further, both processes are somewhat limited when the hot fill application requires a container with a small threaded mouth. Such containers are typically produced by preforms where the neck or mouth finish is formed in the open end of the preform and the neck finish is not distended in the blowing stage when the container is formed. Thus, the neck finish is not molecularly oriented. Should the neck finish be subjected to particularly high temperatures, such as that in the heat set step, and if the finish is not rapidly cooled, spherulitic crystallinity will produce whitening or clouding of the finish whereas the body portion of the container which has been molecularly oriented and quickly cooled will not experience whitening or clouding at the heat set temperature specified. Accordingly then, provisions must be made in the heat set process to rapidly cool the neck finish and then increase wall thickness of the neck finish if a clear container is desired, or alternatively, to produce spherulitic crystallization in the essentially amorphous neck finish as discussed.

Finally, both processes use a two stage process to produce the preform. Heretofore, a one stage process has not been used to produce PET containers suitable for hot fill application.

C) Single Stage PET Processes

In a two stage process, a preform previously made and substantially in an amorphous state is reheated to its preferred molecular orient temperature whereat it is blow molded into its desired shape. As used herein a two stage process will mean any process which produces a preform that is required to be reheated from ambient temperature to its blow molding temperature. In contrast, single stage processes form the preform, transfer the preform from the injection or extrusion mold (after it has cooled to some temperature) to a conditioning or tempering station whereat it homogenizes or equilibrates to a preferred molecular orient temperature. The preform is then transferred to a blow mold whereat it is formed into its desired shape. This process is generally illustrated in assignee's Stroup U.S. Pat. No. 4,372,910 and the preferred embodiment of the present invention has been practiced in a machine (Van Dorn Plastic Machinery's CIB single-stage injection/blow molder) generally disclosed in Stroup.

Inherent in any one stage process, is the fact that an unequal distribution of heat will exist through the cross-sectional wall thickness of the preform at the time it is transferred from the injection or extrusion mold. A number of patented processes exist relating to the timing and temperatures of the preform when it is pulled from the injection mold to optimize the cycle time. Ryder U.S. Pat. No. 4,473,515 discusses a number of such patents and discloses a process which waits until the average wall temperature in the injection mold reaches the preferred molecular orient temperature before the preform is transferred so that the preform simply can equilibrate to a uniform cross-sectional wall temperature equal to the preferred molecular orient temperature. In Valyi U.S. Pat. No. 4,382,905 an "interrupted quench" is disclosed in that the preform is removed from the injection mold "prematurely" and the cooling thereof continued in a conditioning mold after which the preform is transferred to yet another conditioning or temper station at a higher temperature whereat it equilibrates to its preferred molecular orient temperature, etc. In Valyi, injection time is thus shortened to increase utilization of the injection molds. All of the single stage patent literature discloses the final shaping or molding of the container with PET material which is somehow brought through a conditioning station to a uniform cross-sectional wall temperature which is at a preferred molecular orient temperature for the PET.

It is well known that molecular orientation of PET may occur over a temperature range varying from just above the glass transition temperature, $T_g$ (which is the temperature below which the PET is in a glassy state), up to just below the melt temperature of PET. If orientation is attempted at a temperature too close to the $T_g$ temperature, the material is too stiff to stretch. As the temperature increases, processing improves significantly but a practical upper limit is reached at or near the temperature at which large aggregates of crystallites called spherulites begin to form. The orientation process is adversely affected by spherulite growth. The preferred molecular orient temperature for conventional PET as taught in the patents discussed is universally known to be within a close range either between 190°–200° F. or 195°–205° F. The single stage processes in accordance with the literature noted above, will not produce PET containers which can withstand deformation at elevated temperatures because blow molding the containers at the preferred molecular orient temperature will not produce a crystallinity in the structure sufficiently high to withstand deformation.

D) Prior Art Container Configurations

Generally speaking, the container deformation problems attributed to vacuum are treated separately from the thermal deformation problem discussed above although crystallinity increase may have some effect on container rigidity.

The Agrawal reference discloses the concept of a vacuum deformable panel which is molded into the container. The panels are surface indentations formed in the container's side walls and/or in the container's base which pull inwardly under a vacuum. Of course, when the cap is opened, the panels expand radially outwardly to their molded shape. By positioning the panels, bottle or container shape may be kept within some degree of overall configuration.

Various configurations have been developed other than panels to maintain the overall shape of the container. In Ester U.S. Pat. No. 4,610,366, sharply formed indentations are provided in the side wall to maintain the bottle diameter while permitting vertical movement. The ring configuration thus disclosed in Estes permits the bottle to move as an accordion while retaining its O.D. dimension.

While such arrangements generally perform an acceptable function of overall shape retention, the bottles all flex their side wall. This in turn requires special labels and/or labelling techniques to be used by the bottler. In typical glass bottling operations, a light weight paper label is simply glued onto the bottle as it is rolled after the bottle is hot filled and capped. The PET side wall configurations of the prior art move and will not hold conventional, glued light weight paper labels, especially when the vacuum seal is broken and the bottle expands.

Apart from labelling concerns, conventional bottling operations, at least for small mouth bottles, typically employ star wheel layouts whereat bottles are filled in one wheel and transferred to another wheel whereat a capper screws the closure onto the bottle while the wheel rotates at high speed. It can be appreciated that the fill is still hot when the capping mechanism tightens the closure. The ability of PET material to withstand compressive forces is reduced at elevated temperatures. While the capper mechanism can be and has been altered to reduce axial force loadings on PET containers and/or PET containers have been altered to provide mouth rings for loading purposes, such factors affect the bottle configuration. Apart from any of these conditions, PET bottles must have a side wall strength sufficient to permit stacking one on top of the other without collapse. Vacuum panels indented into the side wall do not assist the container in developing sufficient axial strength to resist deformation.

SUMMARY OF THE INVENTION

Accordingly, it is a principle object of the present invention to develop a PET container which is thermally stable and is produced in a one stage process.

This object along with other features of the invention is achieved in a one stage process for forming, in the absence of a heat set step, a PET container for use in hot fill applications which includes the sequential steps of drying the PET material to a dew point substantially less than that of the ambient temperature and maintaining the dried material at the dew point in an enclosed space. The dried material is plasticized and injected or extruded at an initial temperature of about 520° to 550° F. into a cold preform mold and rapidly cooled at a rate which is sufficiently high to prevent spherulitic growth but sufficiently long in duration to permit adding additional plasticized material to the preform mold to compensate for volumetric contraction until the surfaces of the preform reach a temperature of about 230° to about 260° F. At that time, the preform is transferred from the preform mold to a conditioning station. At the conditioning station, the cross-sectional wall temperature of the preform is equilibriated to a uniform temperature of between about 210° F. to about 230° F. over a time period which is sufficient to develop a crystallite formation of at least about 30% at which time the preform is stretched and blow molded in a blow mold into a desired container shape with the stretching and blow molding commencing when the preform is at a temperature of about 210° to 230° F. and completed when the temperature of the container is about 50° F. to about 150° F. whereby a thermally stable container is produced.

In accordance with a particularly significant feature of the invention, the PET material is relieved or relaxed in its pre-plasticized state by drying preferably to a moisture content less than about 0.02% by weight and maintaining the dried material in the enclosed space such that its dew point is less than about −35° F.

In accordance with another particularly significant feature of the invention, the preform is formed in the preform mold with a mouth portion and a test tube shaped body portion extending therefrom and the body portion has a transition zone extending a fixed longitudinal distance from the mouth portion. The mouth portion of the preform is formed in the injection mold to the finished container dimension such that a small mouth container will result at the conclusion of the blow molding stage. Importantly, the cooling rate within the preform mold is sufficient to drop the surface temperature of the mouth portion below the $T_g$ temperature while the surface body portion, excluding the transition zone, is maintained within the aforesaid range of 230° to 260° F. Heat is then inputted to the interior and exterior surfaces of the transition zone in the conditioning station to cause the longitudinally extending temperature gradient within the transition zone to fall within the range of about 210° to 230° F. during the time that the cross-sectional wall temperature equilibriates in the conditioning station so that the transition zone can be formed with a sufficiently high crystallite level and can be biaxially oriented in the blow molding step. Because of the crystallinity achieved in the transition zone, less PET material is used in the finished container than what otherwise would be required.

In accordance with a secondary aspect of the invention, the preform is transferred and held within the conditioning station and transferred from the conditioning station to the blow mold station by a fixture which encircles the mouth portion and acts as a heat sink to prevent spherulitic crystallization of the mouth portion.

In accordance with yet another specific process feature of the invention, the transition zone of the preform is formed so that it increases in wall thickness in a frustoconical manner as it extends from the mouth portion and the stretching and blowing step is sufficient to form a container having a bulbous neck portion adjacent the mouth portion such that the bulbous neck portion includes a first concave arcuate surface blending into a second convex arcuate surface such that at least the first arcuate surface of the container corresponds to the preform's transition zone which is biaxially oriented in the blow mold and attains a sufficiently high level of clear crystallinity in the transition zone to maintain proper attitudinal relationship between the mouth portion of the container and the body portion of the container during and after hot fill and capping.

In accordance with yet another specific aspect of the invention, gussets are formed in the first arcuate surface in the blow molding stage to maintain mouth-body orientation.

In accordance with an important processing feature of the invention, the time period of the preform cooling step is equal to the time period of the transferring and equilibriating step so that the one stage processing speed is optimized.

In accordance with other important process considerations, the consistency and process optimization is significantly enhanced by controlling the aforesaid temperature ranges to tighter values, by controlling the blow stretching step in accordance with known parameters, by selecting a PET composition within conventional limits, all as more particularly set forth in the following detailed description.

In accordance with yet another aspect of the invention, a thermally stable, vacuum compensable PET container suitable for hot fill applications is provided. The container includes a generally amorphous threaded mouth portion and a highly crystallite cylindrical body portion extending from the mouth portion. The body portion has a generally constant wall thickness and includes a generally frusto-conical neck portion extending from the mouth portion, a generally cylindrical side wall portion extending from the neck portion and a generally circular end wall portion extending from the opposite end of the cylindrical side wall portion which provides the bottom of the closure. A vacuum distortion mechanism is provided in the neck portion and in the end wall to permit the container to shrink when a vacuum is drawn in the container. Importantly, a rigidizing arrangement is provided in the cylindrical side wall to prevent radial and longitudinal movement of the side wall when the vacuum is drawn in the container. The rigidizing arrangement includes a series of inwardly projecting ring segments longitudinally spaced from one another and contiguously interconnected by a series of cylindrically shaped flat land segments. The land segments permit glued application of conventional thickness papers labels to the container while functioning to rigidize the ring segments. More particularly, each ring segment includes a first frusto-conical wall segment sharply extending from one end of a land segment, a second frusto-conical wall segment sharply extending from an end of an adjacent land segment and an arcuate wall segment joining the first and second frusto-conical wall segments together at their intersection.

In accordance with another particularly important aspect of the container configuration, a bulbous arrangement is formed in the neck portion of the container adjacent to the mouth portion for rigidizing the mouth portion relative to the body portion while providing an additional contraction-expansion area in the container such that a sufficient vacuum contraction area is provided within the container to permit container deflection without subjecting the cylindrical ring portion to undue vacuum pressure. The bulbous arrangement includes a radially outwardly extending first concave arcuate segment adjacent the mouth portion and a second arcuate "S" shaped segment contiguous with and extending from the first arcuate segment to form a bulbous wall segment in the neck. A strengthening arrangement is provided in the first arcuate surface to rigidize the mouth portion relative to the body portion and the strengthening arrangement includes at least one protrusion formed in the shape of a gusset so that the mouth portion retains its proper attitude relative to the body portion not only when the vacuum is drawn but also during hot filling of the container. Importantly, the protrusion or gusset is in the general shape of a triangle with the base of the triangle adjacent the intersection of the first arcuate segment with the cylindrical mouth segment and the triangle protruding above the surface of the first arcuate segment at its base and generally blending into the first arcuate segment at its apex. Preferably a plurality of the protrusions are provided in equally spaced increments about the cylindrical mouth segment.

Accordingly, it is a principal object of the present invention to use a one stage process to produce a thermally stable PET container.

It is another object of the present invention to use a one stage process to make a thermally stable bottle suitable for hot fill applications.

It is another object of the invention to produce a one stage process for making a thermally stable bottle suitable for hot fill applications which has a small threaded mouth.

It is another object of the present invention to make a thermally stable PET container which has less weight than other PET containers of the same capacity.

It is another object of the present invention to produce a thermally stable container in an optimally timed process.

It is yet another object of the invention to provide a thermally stable PET container which is clear.

It is still yet another object of the invention to provide a small mouth PET thermally stable container which has high crystallinity throughout its side walls including that side wall portion corresponding to the preform transition zone adjacent the generally amorphous mouth.

Still yet another object of the invention is to provide a PET container for hot fill applications which has a body portion to which can be applied paper labels.

It is yet another object of the invention to provide a PET container suitable for hot fill applications which has a body portion to which thin paper labels can be glued in a conventional manner.

Yet another object of the present invention is to provide a PET container suitable for hot fill applications which has a small mouth portion and a body portion with a rigidized transition between the mouth and the body portion.

Still yet another object of the invention is to provide a PET container suitable for hot fill applications which is able to withstand high vertical loads.

Still yet another object of the invention is to provide a PET container having a small mouth which is suitable for hot fill applications and which is so constructed with vacuum deformation areas and rigidized body areas that the rigidized body areas will not significantly deflect radially or longitudinally when a vacuum is drawn in the container.

These object and other features of the invention will become apparent to those skilled in the art upon reading and understanding the Detailed Description of the invention set forth below.

BRIEF DESCRIPTION OF THE DRAWINGS

The invention may take form in certain parts and arrangement of parts, a preferred embodiment of which will be described in detail and illustrated in the accompanying drawings which form a part hereof and wherein;

FIG. 5 is an elevation of the container shown in FIG. 4;

FIG. 6 is a top view of the container shown in FIG. 5;

FIG. 7 is a cross-sectional view of a portion of the ring wall section of the container shown in FIGS. 4 and 5;

FIG. 8 is a top view showing a modification to the top portion of the container shown in FIGS. 4 and 5; and FIG. 9 is a plan view of the top portion of the container shown in FIG. 8.

DETAILED DESCRIPTION OF THE INVENTION

Figure 1:
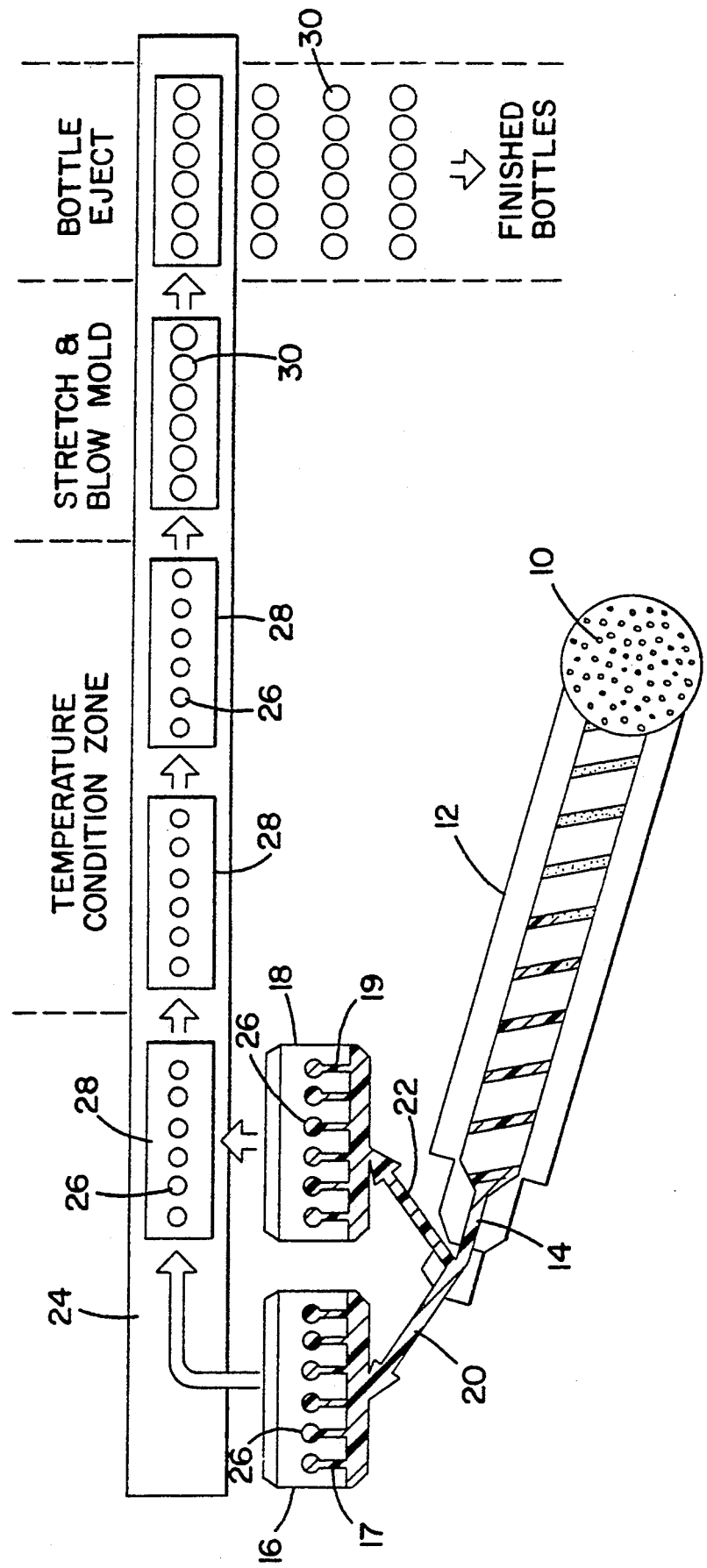
FIG. 1 is a flow chart of the inventive process and is identical to FIG. 1 of the parent and grandparent application.

Referring now to the drawings wherein the showings are for the purpose of illustrating a preferred embodiment of the invention only and not for the purpose of limiting the same, FIG. 1 schematically shows a flow chart of the process. As noted above, the process has been practiced on a one stage molding machine developed by the assignee of the present invention and disclosed in operation in Stroup U.S. Pat. No. 4,372,910 which is incorporated by reference herein and made a part and parcel hereof. It is not necessary, however, that assignee's single stage machine be used in order to practice the invention. Other single stage machines can be employed.

Returning now to FIG. 1, PET material 10 is plasticized in injection molded machine 12 which is conventional, although an extruder may also be used. The plasticized PET material is advanced from the injection molding machine 12 to preform molds 16 and 18 through runners 20 and 22, respectively. Preform molds 16 and 18 are identical and entirely conventional. Molds 16 and 18 have gate valves 17 and 19, respectively, to permit the plasticized PET material 14 to enter the preform cavities within the preform molds. A preform 26 is formed in each cavity. Each of the gate valves can be of conventional design such as, for example, dedicated pin-type valves for opening and closing the valve stream to the cavity. The valves can be operated by double-acting pistons. Each mold 16 and 18 may have one or more preform cavities. Two to six of such cavities would be common, and six cavities are illustrated in FIG. 1.

The runners 20 and 22 are structurally adequate to contain the plasticized PET material 14 and are heated at a temperature controlled to maintain proper melt viscosity. The plasticized PET material 14 is advanced to the molds 16 and 18 by the pressure from the output of the injection molding machine 12. The runners 20 and 22 are preferably designed with minimum size and minimal time during which the PET material is at elevated temperatures to reduce the energy consumption of the system and minimize the time over which the PET material is held at temperatures at which it can degrade and produce unwanted by-products.

A preform transfer device (not shown in the drawings) is provided for transferring molded preforms 26 from molds 16 and 18 to preform holders 28 which are then conveyed along conveyor 24. The preform transfer device handles the preforms 26 only by their closure ends, where substantially greater cooling takes place. This minimizes the possibility of damage to the preforms and ultimately to the finished plastic containers 30. Importantly, preform holders act as a heat sink. The preforms are deposited on the preform holders 28 which, again, have physical contact only with the closure ends. The preform transfer device may be of several different types and may be generally of the type known in the art such as those disclosed in U.S. Pat. Nos. 4,011,039 and 4,106,886, which are incorporated herein by reference.

The preforms 26 are advanced along conveyor 24 through a temperature conditioning zone. Two temperature conditioning stations are illustrated in FIG. 1 which make up the temperature conditioning zone. At each of these stations, the preforms 26 are brought into close proximity with heating devices which through suitable controls add or maintain sufficient thermal energy uniformly to the preforms 26 to make them ideally suited for subsequent orientation by means of the stretch and blow molding operation. The actual conditioning devices will be explained in detail hereafter. Suffice it to note that there are any number of telescoping canister-like devices, shaped or unshaped, in the prior art which can and have been used for exterior transfer or shaped surface heating and/or cooling.

The thermally conditioned preforms 26 are then advanced to the stretch and blow molding zone. The stretch and blow molding apparatus may be any conventional apparatus used in the art for stretching and blowing preforms 26 into finished containers 30 in accordance with known techniques. Preferably, the stretch and blow mold apparatus also includes a station at which the finished articles are ejected so that they may be automatically placed on conveyor 24. Any suitable stretch and blow mold apparatus can be employed, examples which are disclosed in U.S. Pat. Nos. 3,596,315; 3,963,404; 3,986,807; and 4,141,680, these patents being incorporated herein by reference.

In accordance with the inventive method, the PET material is dried in an enclosed space and then plasticized in extruder 12. The plasticized PET material 14 initially is advanced through runner 20 to preform mold 16, then sequentially through runner 22 to preform mold 18. The plasticized PET material 14 first flows through gate valves 17 to fill the preform cavities in mold 16 while valves 19 are closed. Then mold 18 is filled by opening gate valves 19. During the filling of mold 18, gate valves 17 are kept open to provide packing pressure and a small amount of make-up of melted PET material to compensate for shrinkage during cooling in mold 16. After a minimum period of time to allow sufficient cooling and shrinkage compensation flow valves 17 are closed, the formation of the molded preforms 26 in mold 16 is completed, and the preforms 26 are removed from mold 16 and transferred to preform holder 28. Similarly, during the filling of mold 16, gate valves 19 are kept open to provide packing pressure and a small amount of make-up of melted PET material to compensate for shrinkage during cooling in mold 18. After a minimum period of time to allow sufficient cooling and shrinkage compensation flow valves 19 are closed, the formation of preforms 26 in mold 18 is completed, and the preforms 26 are removed from mold 18 and transferred preform holder 28.

The preform transfer device is first oriented to the preform mold 16 and upon the opening of mold 16 retrieves the preforms 26. Suitable controls cause the device then to transport the preforms 26 to preform holders 28 which are conveyed along conveyor 24. These controls then cause the transfer device to reorient to mold 18 at an appropriate time interval coinciding with the opening of the mold 18. Molds 16 and 18 are controlled to operate at equally spaced time intervals. The transfer device then retrieves the preforms 26 from mold 18 and transfers them to preform holders 28 which are conveyed by conveyor 24.

The preforms 26 are conditioned, stretched, and blown into finished containers 30 in accordance with known techniques. In the stretching and blow molding step, a container mold initially closes around the preform 26 in such a way that the preform holders 28 are guided into and are mechanically interlocked with the mold cavities. A rod-like device is then inserted through the neck of the preform 26 to effect preform stretching. A sealing device is actuated at this time to ensure air pressure sealing of the container. A controlled flow of compressed air is simultaneously introduced to produce stretch and pressure expansion combinations to achieve the desired expansion rate and the finished container wall thickness, orientation, and surface detail. In one embodiment of the invention, low pressure air at a pressure of about 125 psig is applied, then high pressure air at a pressure of about 450 psig is added about 0.015 second later to effect the desired expansion. Following a suitable cooling time within the mold, the internal air pressure is released, the stretching rods are withdrawn, and the mold clamping device is opened. Finished containers 30 ready for subsequent operations, such as labeling, are ejected from the molds. The products may be ejected onto a suitable conveying device to be removed from the area around the stretch and blow molded apparatus.

The invention, as thus far defined, is conventional in that the system forms a preform 28 in an injection molding machine 12 which is thermally conditioned at a conditioning station and then stretched and blow molded in the stretch and blow molding apparatus. The PET material is conventional and as used herein is meant to include polyethylene terephthalate polymers which are generally prepared from terephthalic acid or its ester forming derivatives and ethylene glycol or its ester forming derivatives. In general, at least about 97% by weight of the polymer can comprise repeating ethylene terephthalate groups of the formula:

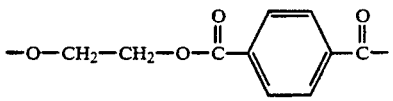

The remainder of the polymer can comprise various ester forming compounds.

The present invention also contemplates the use of copolymers of the polyethylene terephthalate in which a minor proportion, for example, up to about 10% by weight, of the ethylene terephthalate units are replaced by compatible monomer units in which the glycol moiety of the monomer is replaced by aliphatic or alicyclic glycols such trimethylene glycol, tetramethylene glycol, polytetramethylene glycol, hexamethylene glycol, dodecamethylene glycol, diethylene glycol, polyethylene glycol, polypropylene glycol, propane-1, 3-diol, butane-1, 4-diol, neopentyl glycol and cyclohexanedimethanol, bisphenols, and other aromatic diols such as hydroquin-one and 2,2-bis (4'-beta-hydroxetholyphenyl) propane. Examples of dicarboxylic acid moieties which can be substituted into the monomer unit include aromatic dicarboxylic acids such as phthalic acid, isophthalic acid, naphthalenedicarboxylic acid, diphenyldicarboxylic acid, diphenoxyethanedicarboxylic acids, bibenzoic acid, and aliphatic or alicyclic dicarboxylic acids such as adipic acid, sebacic acid, azelic acid, decanedicarboxylic acid and cyclohexanedicarboxylic acid. In addition, various multifunctional compounds such as trimethylol-propane, pentaerythritol, trimellitic acid and trimesic acid can be polymerized with the polyethylene terephthalate polymer in amounts of up to about 2% by weight. The above-described comonomers or multifunctional compounds can be employed in amounts which do not adversely affect the crystallinity of the polyester polymer.

The PET polymers that are useful in the present invention can also contain other compatible additives and ingredients which do not adversely affect performance characteristics of the container such as adversely affecting the taste or other properties of products packaged therein. Examples of such ingredients include thermal stabilizers, light stabilizers, dyes, pigments, plasticizers, fillers, antioxidants, lubricants, extrusion or injection molding aids, residual monomer scavengers and the like.

PET having an intrinsic viscosity (I.V.) of preferably from about 0.60 to about 1.04, more preferably from about 0.6 to about 0.85, more preferably from about 0.7 to about 0.8, and advantageously about 0.74 or about 0.80 can be employed in producing the containers of the invention. I.V. measurements are made according to the procedure of ASTM D-2875, by employing 0.0050±0.00002 g/ml of the polymer in a solvent comprising o-chlorophenol (melting point 0° C.), respectively, at 30° C. I.V. is calculated by the following formula:

$$I.V. = \frac{\ln \frac{V_{soln}}{V_{sol}}}{C}$$

wherein $V_{soln}$ is the viscosity of the solution in any units; $V_{sol}$ is the viscosity of the solvent in the same units; and C is the concentration in grams of polymer per 100 mls of solution.

A critical aspect of this invention relates to the fact that the PET, which is typically in the form of pellets or powder, must be dried before it is plasticized. In this regard, it is believed essential that the polyester material be dried to a moisture content of about 0.02% by weight or less, with a moisture content in the range of about 0.015% to about 0.020% by weight being particularly advantageous. It is essential that the dry material be maintained in a dry enclosure prior to use. The dew point within this enclosure being about −35° F. or less, preferably about −40° F. or less, with a dew point in the range of about −35° F. to about −50° F. being particularly useful. The dry enclosure can be, for example, the feed hopper of the molding machine used to plasticize the PET material, or it can be an enclosed vessel connected to the feed hopper (not shown).

Drying the pelletized feed material in this manner is believed to relieve the molecular chain. It is necessary to obtain consistent results and is believed critical to forming certain container shapes. It is believed that pretreating the PET material in this manner inherently distinguishes the single stage process of the present invention from prior art two stage processes in which the preform is initially formed and at some later time, reheated and stretched and blow molded into the desired container configuration. Specifically, while preforms in either one or two stage processes use a feed hopper in which the PET material is somewhat preheated and dried, the drying of the present invention is substantial in distinction to conventional arrangements, and this in turn differentiates the present process from prior art processes which might use similar temperatures in subsequent process steps. However, assuming that a preform in a two stage process is initially formed within the drying limits set forth above, the preform, once formed, would be subjected to ambient temperatures and the moisture associated therewith. Thus, a preform formed in the two stage process would not be the equivalent of the preform formed in the present invention unless the two stage preform was maintained within an enclosure having the dew points indicated above, which simply is not practical.

Figure 2:
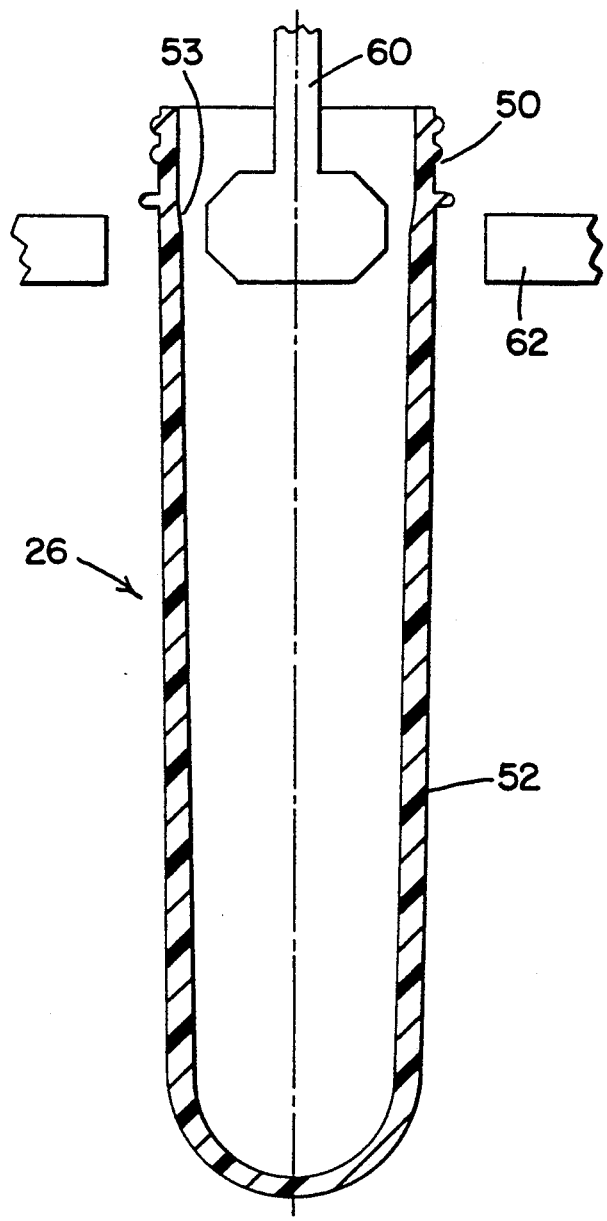
FIG. 2 is a cross-sectional view of the preform formed in the process with a schematic representation of heater position used in the process.
Figure 3:
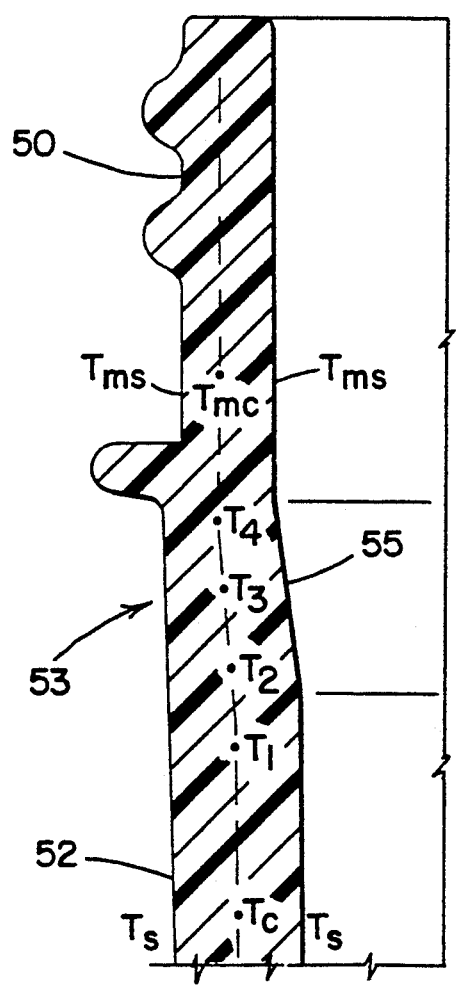
FIG. 3 is an expanded view of the wall section of the top portion of the preform shown in FIG. 2.

The temperature and time or rate limitations for the process are critical and are set forth in tabular form below. It is a particular aspect of the invention that small mouth PET containers suitable for hot fill applications can be produced and preform 26 shown in FIG. 2 which is formed in preform molds 16 and 18 has a shape which includes a mouth portion 50, which preferably is threaded, and a body portion 52, which generally is in the shape of a test tube extending from mouth portion 50. As is customary, mouth portion 50 is formed in preform molds 16 and 18 to the desired finish shape of the container. Also, there is in body portion 52 a transition zone or segment 53 as shown in FIG. 3. As is well known in the plastic molding art, the wall thickness of preform's body portion 52 is determined by the container's shape and the body portion's wall thickness is generally different (at least for the 64 fluid ounce container size of the preferred embodiment) then the thickness of the wall of mouth portion 50 and the blending from mouth portion 50 to the wall thickness of body portion 52 can be referred to as transition zone 53. However, transition zone 53 is not physically limited to the frustoconical blend surface 55 shown in FIG. 3. For purposes of discussion, transition zone 53 is defined as that longitudinal segment of body portion 52 which extends from mouth portion 50 and over which a longitudinally extending temperature gradient exists which represents a temperature gradient from mouth portion 50 to body portion 52. The transition segment will always include as a minimum blend surface 55, but in actuality may extend beyond blend surface 55.

Preform 26 is differentially cooled in preform molds 16 and 18 (which are cold molds) such that when the preform is transferred from the molds, the inside and outside surface temperatures of mouth portion 50 are below the $T_g$ temperature while the interior and exterior surfaces of body portion 52 (excluding transition segment 53) are at the temperatures specified below. This cooling is accomplished over a time period which is at least long enough to permit the make-up PET material to be added to preform 26 to insure that the preform has solid walls and at a speed sufficiently fast to prevent spherulitic crystallization of mouth portion 50. The exact times for the examples specified is set forth below. Thus, when the preform is transferred from preform molds 16, 18, the longitudinally extending temperature gradient will exist in transition segment 53 between the cold mouth portion 50 and the hotter body portion 52. This temperature gradient is in addition to the cross-sectional wall temperature gradient which is traditionally equilibriated in the single stage prior art conditioning stations. More particularly, referring to FIG. 3 and assuming for discussion purposes that the I.D. wall temperature and O.D. wall temperature are approximately the same, then it is conventionally known that the temperature $T_c$ at the center of preform wall and body portion 52 will be higher than the temperature $T_s$ at the surface of the wall in body portion 52. However, the temperature at the center of the wall $T_{mc}$ of mouth portion 50 will likewise be higher than the temperature $T_{ms}$ at the surface of mouth portion 50. Because $T_{ms}$ is lower than $T_s$ and because $T_{mc}$ is lower than $T_c$, a longitudinally extending temperature gradient indicated as $T_1$, $T_2$, $T_3$ and $T_4$ will exist within transition zone 53. Establishing a workable temperature gradient in preform molds 16, 18, and refining the temperature distribution in the conditioning station and even including the biaxial orientation and configuration of the transition segment 53 into the shape of the finished container are all critical aspects of the invention.

As noted, once the differential cooling rates have established a desired temperature of the preform within preform molds 16, 18, (which also establishes a workable transition temperature gradient), preforms 26 are transferred by collets which contact the outside surfaces of mouth portion 50. In the preferred embodiment, the collets remain on mouth portion 50 through the blow molding and stretching apparatus and function as a heat sink causing continued cooling of mouth portion 50 to maintain its temperature below the $T_g$ level. If necessary, provisions can be made for cooling the transfer collets (not shown).

When preforms 26 are moved into the conditioning zones, the cross-sectional wall temperature is allowed to equilibriate to a uniform cross-sectional temperature which is set forth in tabular form below. The time at which the equilibriation occurs is controlled so that a crystallinity of at least about 30% is produced in body portion 52. Importantly, the crystallinity is believed to result because preform 26 in the first instance is pulled from preform molds 16, 18 at a higher temperature than that which is customarily taught in the PET one stage process art and is allowed to equilibriate to a blow molding temperature which is higher than the preferred molecular orientation temperature of PET as taught in the prior art. The elevated temperatures held over the time period set forth below develop a desired crystallinity level in the body portion 52 of preform 26. In order to develop an acceptable crystallite structure in transition segment 53, heat must be inputted to transition segment 53 during the equilibriation step. This is accomplished, as shown in FIG. 2, by means of an especially configured telescoping interior resistance heater 60 and an external resistance heater 62 both of which are precisely positioned relative to transition segment 53 to input heat directly to transition segment 53. This heat is inputted to reduce gradient spread and generally raise the temperature throughout transition segment 53. That is, when equilibriated, the cross-sectional wall temperature gradient through the transition segment 53 will be somewhat uniform and the longitudinal gradient will be within the specified range of about 210° to about 230° F. whereas the cross-sectional wall temperature will be uniform within a tighter range. Finally, it should be noted that when the preform is pulled from the preform mold, because body portion 50 is at a higher temperature than transition segment 53 which must be reheated to the preferred blow molding temperature, a slight differential in crystallinity may exist in transition zone 53 depending upon the equilibriation time. That is, if the crystallinity in body portion 52 is at least about 30%, the crystallinity of the container corresponding to transition segment 53 might be less but in no event less than about 28% crystallinity.

It should also be noted that single stage processes are dropping to an equilibriation temperature while two stage processes are raising to an equilibriation temperature. Provided that the equilibriation temperature is at a preferred PET molecular orient temperature, the prior art processes are equivalent if the cooling rate in the single stage process is fast enough to arrive at the preferred orient temperature without crystallite growth. Based on the observations of the inventors, the single stage preform is arrested in its cooling rate, as in the present invention, it is believed that the process cannot be duplicated in the two stage method because of the time it takes to reheat the two stage preform. That is, if the preform in a two stage process was heated to a higher temperature than the preferred molecular orient temperature (as in the present invention) and then allowed to equilibriate, a different crystallite structure would probably be produced in the two stage preform when compared to a single stage process because heating from the preferred orient temperature to the elevated temperature would take time and produce crystallinity which would continue to form then in the two stage method during the time the two stage preform equilibriated back to the preferred molecular orient temperature.

Several other aspects of the invention should also be pointed out. Mouth portion 50 of the container is substantially clear and is produced in its finished form in the preform mold. It is not spherulitically crystallized, but because of the heat at $T_{mc}$, mouth portion 50 is not in a purely amorphous form when the container is produced in the blow molding step. Because the surface temperature of mouth portion 50 is purposely driven below the $T_g$ temperature and maintained thereat throughout the process, mouth portion 50 will be designated herein and in the claims hereof to mean in a generally amorphous condition which means nonspherulitic but not purely amorphous. The process as thus described is purposely geared to producing a high crystallite level in transition segment 53 and transition segment 53 inherently arises because of the small mouth container geometry. As is well known to those skilled in the art, if the crystallinity levels in the transition segment cannot be achieved, the thickness of the container wall corresponding to the transition segment will have to be increased to compensate for the stability loss. The result is an increase in the weight and cost of the container, and it is believed that in a 64 fluid ounce container the weight differential can result in almost 10 grams, i.e. the difference between a 90 gram and an 80 gram container.

In the preferred embodiment and for a preform having generally uniform wall thickness throughout body portion 52 (excluding transition segment 53) equilibriation occurs in the absence of any heat input other than that provided by resistant heaters 60, 62 to transition zone 53. That is, preform 26 is subjected to simply ambient temperature (approximately 70° F.) and allowed to equilibrate in the conditioning zone for the time period specified. Obviously, if the wall thickness of body portion 52 is significantly varied such as a thinner section at the base of body portion 52, some heat may have to be applied to the thinner section to slow the cooling rate of the thinner section in the conditioning station to equal that of the thicker sections. Thus, it can be appreciated that since heat is not being inputted to body portion 52 in the preferred embodiment, a temperature band of cross-sectional uniformity will be achieved within a very narrow time period which will be dependent upon the temperature at which body portion 52 is pulled from preform mold 16, 18 and this in turn will affect the crystallinity levels achieved in the process. Specifically, if preform 26 is pulled from preform mold when the wall temperature $T_s$ of preform body portion 52 is at a higher temperature than that specified, the preform which will not equilibrate at the same uniform wall temperature as that of the present invention. Further, if that preform was allowed to stay in the conditioning station for the same time period, equilibration would not have occurred. Also, if the preform were pulled from the preform mold at a lower temperature than that specified and allowed to remain in the conditioning station at the same time period as that specified, then the $T_s$ temperature would drop below the $T_c$ temperature and a uniform wall temperature would not exist at the blow molding station. It is a specific feature of the invention that the temperature-time ranges established for the two very critical steps of the process have been established to equal one another to maintain efficient use of the injection molder. It is for this reason that a second conditioning zone has been selected. Heretofore, single stage processes pulled the preform at much lower temperature than that specified. In one instance, Valyi U.S. Pat. No. 4,382,905 discloses pulling the preform at higher temperatures but then immediately continues the cooling of the preform in a separate station followed by a reheat in the conditioning or tempering station so that the throughput for the injection molding machine can be increased. In the present invention, throughput is increased without the necessity for continued cooling of the preform followed by tempering.

After the preform 26 has equilibrated in temperature, it is then transferred to the blow molding station which is a cold blow mold. From a process point of view, the blow molding is timed to correspond to the other process steps although it is not believed that the timing of the blow mold step is as critical to the working of the invention as the preform molding step and the equilibriation step so long as the container can be cooled within the time of the other steps. However, it is known that the axial and radial stretch ratios can have some effect on the crystallinity in the molded container. Accordingly, it is desired to fix the stretch ratios as follows:

The extent of stretching effected in the stretchblowing operations may vary within certain preferred limits and can be controlled by fixing the relative dimensions of the initial preform 26 and the finished container 30. One commonly used measure of the extent of stretch achieved is the combined stretch ratio, $S_C$. For generally cylindrical containers, e.g., bottles, this valve is the product of the axial stretch ratio ($S_A$) and the radial stretch ratio ($S_R$). That is, $$S_C = (S_R \times S_A):1$$

wherein:

$$S_R = \frac{D_b - D_p}{D_p} : 1$$

$$S_A = \frac{L_b - L_p}{L_p} : 1$$

and $D_b$—maximum outside diameter of the bottle; $D_p$—minimum inside diameter of the preform; $L_b$—length of the bottle below the finish; and $L_p$ length of the preform below the finish.

Typically, commercial size polyester containers of from about 16 oz. to about 64 oz. or larger made according to the present invention can have a combined stretch ratio, $S_C$, of from about 8:1 to about 15:1, preferably from about 8:1 to about 12:1. Within these ranges the axial stretch ratio, $S_A$, may vary from about 2:1 to about 3:1; and the radial stretch ratio, $S_R$, may vary from about 4:1 to about 8:1, preferably from about 4.2:1 to about 7.9:1.

When PET with an I.V. equal to about 0.74 is used, the combined stretch ratio, $S_C$ is preferably about 10:1, with the axial stretch ratio, $S_A$, being about 2.4:1 and the radial stretch ratio being about 4.4:1. When PET with an I.V. equal to about 0.80 is used, $S_C$ is preferably about 9:1, with $S_A$ preferably being about 2.2:1 and $S_R$ preferably being about 4:1. The ratios cited above produce finished container side wall thicknesses of anywhere between 0.012" to about 0.018" and preferably between 0.014" to about 0.016". It is appreciated that weight savings are critical to the economics of the container and thinner wall sections as cited which are achievable with the present process reduce the overall weight of containers, for example for a 64 fluid ounce container from about 90 gram to about 75 to 80 grams.

The preferred temperature ranges and cycle times for the invention are as follows:

| STEPS | PROCESS PARAMETERS TEMP. °F. | | RATE-TIME |
|---|---|---|---|
| | RANGE | PREFERRED | |
| Plasticize | 530-550 | 540-550 | Not significant |
| Pull Injection Mold | 230-260 (body portion) | 235-240 | Rate sufficient to produce $T_g$ or less temperatures in mouth w/o spherulization |
| Equilibriate | 210-230 (body portion) | 210-220 | Time is sufficient to crystallize to stated percentage |
| Pull Blow Mold | 50-150 | 75-100 | Cold mold - rate not especially critical |

Preforms having a substantially constant wall thickness throughout body portion 52 (except for the transition segment 53) produced containers of the design disclosed hereafter in 64 fluid ounce sizes at crystallinity levels of not less than 30%. Specifically, a preform in the general shape as shown in FIG. 2, having an O.D. of about 1⅜" and a total length of around 6", a weight of 72 grams and a wall thickness in body portion 52 of 0.147" was successfully blown into a 64 fluid ounce container with crystallinity at at least about 30% when the time for molding the preform was equal to the time of transferring the preform to the conditioning station and equilibriating the preform at the conditioning station of 18.2 seconds. The time for blow molding was also established at 18.2 seconds for constant throughput. With the same preform configuration but with a wall thickness increased to 0.157" to produce a 77 gram container a cycle time of 19.1 seconds (time to form and pull preform and time to transfer and equilibrate preform) is ideal. As in the first example, the time for blow molding is established at 19.1 seconds for constant throughput.

A container, thus manufactured in accordance with the present process as described above, will have a crystallinity in its side walls of at least about 30% preferably as high as about 32%.

Crystallinity is calculated by the following formula:

$$\% \text{ Crystallinity} = \frac{d_s - d_a}{d_c - d_a} \times 100$$

wherein $d_s$—density of test sample in g/cm$^3$; $d_a$—density of an amorphous film of zero percent crystallinity (for PET 1.333 g/cm$^3$); $d_c$—density of the crystal calculated from unit cell parameters (for PET 1.455 g/cm$^3$). Density measurements are made by the density gradient method described in ASTM 1505.

The crystallinity that is formed in body portion of preform 26 is substantially crystallite in structure, as opposed to a spherulitic structure. As noted, crystallite formation is effected during the formation of the preform 26 when preforms with side wall thicknesses in the above-indicated ranges are employed and temperature and time as discussed below are controlled within certain critical ranges. Crystallite formation also continues until commencement of stretch and blow molding. Crystallite formation in the final container 30 provides a container with desire characteristics of low percent haze a well as heat and pressure-induced distortion resistant characteristics which renders the container suitable for hot fill applications. Spherulite formation, on the other hand, occurs when the preform formation conditions are not carefully controlled with the result being the formation of final containers with undesired levels of percent haze (i.e., they are relatively opaque) that are also relatively brittle and therefore not suitable for use in hot fill applications.

Container 30 is substantially clear throughout, i.e. has low percent haze. In general the container side walls 66 have a percent haze (transmission) of less than about 5%, preferably less than about 3%. Percent haze for transmitted light ($H_T$) is calculated by the formula:

$$H_T = \frac{Y_d}{Y_d + Y_s} \times 100$$

wherein $Y_d$ is the diffuse light transmitted by the specimen, and $Y_s$ is the specular light transmitted by the specimen. The diffuse and specular light transmission values can be measured in accordance with ASTM Method D1003, using any standard color difference meter.

Containers produced with side walls at this crystallinity level of 30% or more are thermally stable and produce a thermal contraction of no more than 2 to 5% in any dimension when subjected to a hot fill process. Shrinkage is directly correlated to the temperature of the hot liquid poured into the container so that the higher the temperature, the more container shrinkage present. There is a variation within the literature as to what the hot fill temperatures are. The shrinkage obtained in containers manufactured in accordance with the invention vary between 2 to 5% with fill temperatures between 185° to 190° F. with 2% consistently achieved at the lower temperature of 185° F. and 5% occasionally achieved at the 190° F. temperature. It should also be noted that the shrinkage percentages given are without any external cooling of the container when hot filled which has been employed on competing processes.

Figure 4:
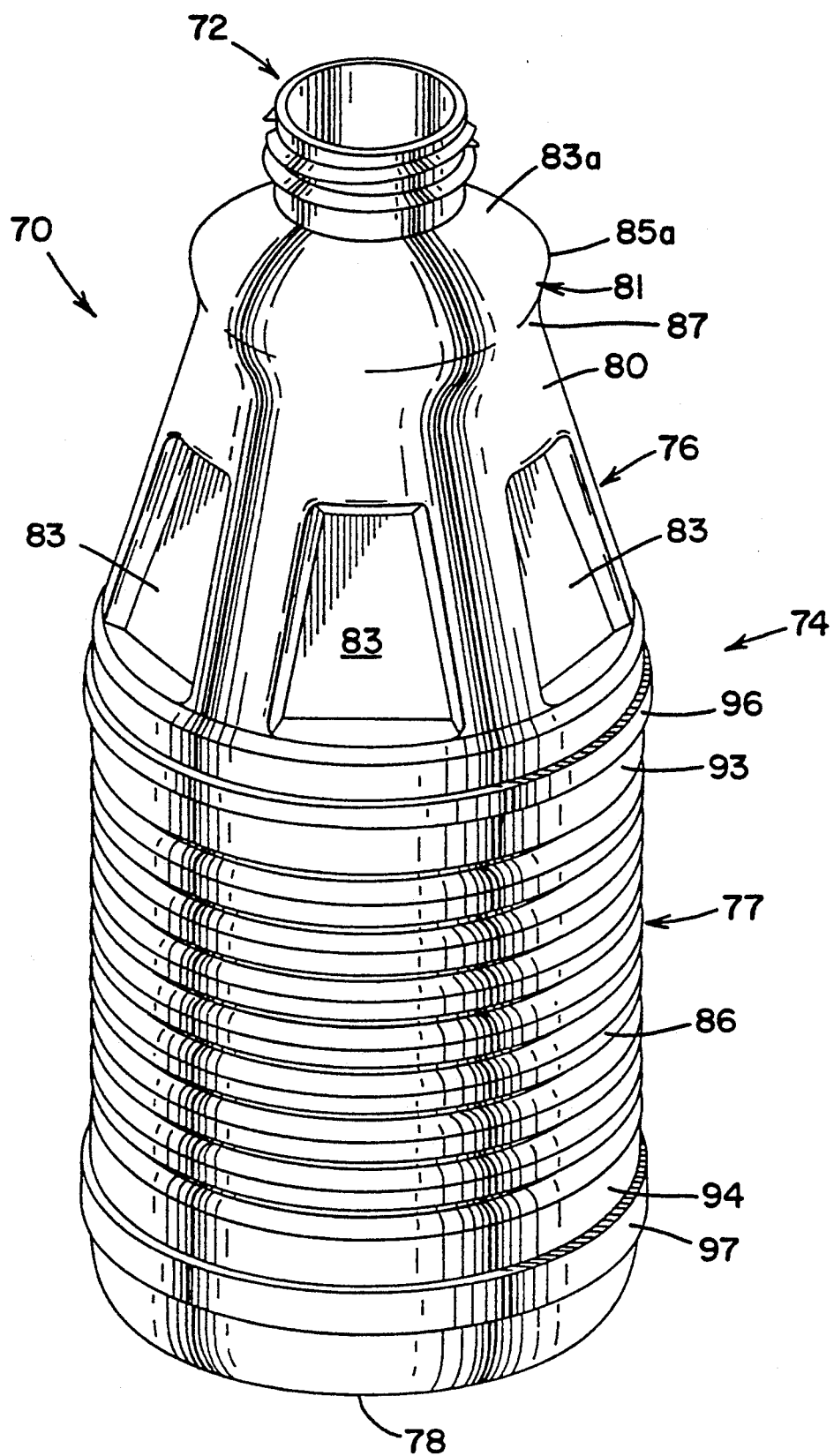
FIG. 4 is a perspective view of the container of the subject application.

Referring now to FIGS. 4, 5 and 6, there is shown a container 70 which generally speaking has a mouth portion 72 which corresponds to mouth portion 50 of preform 26 and a body portion 74 which corresponds to the test tube shaped body portion 52 of preform 26. Body portion 74 in turn has a generally frusto-conical shape neck portion 76, a cylindrically shaped side wall portion 77 and a circular end wall portion 78. Neck portion 76 in turn, for definitional purposes, has a frusto-conical wall segment 80 and a bulbous neck segment 81 which extends to and terminates at mouth portion 72. Conventional type vacuum deformation panels 83 are formed in frusto-conical neck segment 81, there being six panels shown in the preferred embodiment. Heretofore, panels 83 have been traditionally molded in side wall portion 77 and the purpose of the panels is to deflect radially inwardly when a vacuum is drawn in container 70. Similarly, a vacuum panel (not shown) is provided in base portion 78. the vacuum panel in base portion 78 is formed in the shape of a star and is also conventional in the art.

Referring now to FIGS. 5 and 7, side wall portion 77 comprises for most of its longitudinal length a series of radially inward, concave ring segments 85 which are spaced apart from one another and separated from one another by cylindrically shaped flats or land segments 86. As best shown in FIG. 7, each ring segment 85 includes a first frusto-conical wall 88 extending radially inwardly from one land segment 86, a second frusto-conical wall 89 extending radially inwardly and an arcuate wall 90 blending frusto-conical walls 88, 89 together over a converging area. Ring segment 85 is rigid and doesn't significantly expand or contract under vacuum. The sizing of ring segment 85 relative to land segment 86 is believed somewhat critical to achieve this effect in combination, to some extent, with the crystallinity level. As shown in FIG. 7 the longitudinal spacing A of ring segment 85 is approximately equal to the longitudinal distance B of land segment 86 and the frusto-conical angle C which frusto-conical walls 88, 89 form in a plane perpendicular to container longitudinal centerline 79 may be anywhere between about 20°–45°, preferably 30°. Further, arcuate surface 90 takes up approximately one half of the longitudinal space A of ring segment 85. As noted above, side wall shoulder portion 77 permits conventional paper labels to be applied to container 70. Land segments 86 provide support for the paper label such that if container 70 were grabbed about its side wall body portion 77 the paper label would not be distorted. The paper label, however, is preferably glued onto container 70 at leading and trailing land segments 93, 94 which correspond to top and bottom portions of the paper label. As best shown in FIGS. 5 and 7, leading and trailing land segments 93, 94 are offset as at 95 relative to top and bottom cylindrical hoops 96, 97 which permit container 70 to be rolled while the paper labels are being glued onto land segments 93, 94 in the same conventional manner as the labels are applied to glass containers.

The paper label stays on container 70 because the ring-land geometry specified makes side wall portion 77 rigid. It is believed, basically, that the ring segments prevent radial distortion which would otherwise occur from the land segments while the land segments prevent longitudinal distortion which would otherwise occur from the ring segments. The use of the term "rigid" is relative. It is to be appreciated that the wall thickness of container 70 is between 0.014 to 0.018". It is possible to squeeze side wall portion 77 and resiliently distort it although land segments 86 will normally prevent the paper label from being torn or ripped during normal handling of container 70. Rigid is used relative to other container portions which are designed to collapse.

It is to be appreciated that the container in its molded state is filled with a hot liquid product and then capped in about 5-10 seconds after filling. As the product cools, a vacuum is drawn and the shape of container 70 changes to accommodate that vacuum. When the consumer opens the cap, the container reverts back to its as molded form. The contraction of the food product and the accompanying vacuum which thus results for a rigid container is known. For a hot fill, conventional PET container, the vacuum panels are sized to accommodate the contraction and to provide a sufficient contractible area and in conventional PET containers, large vacuum panels are formed in the body side wall. In the present invention, the body side wall is rigidized and the vacuum distortion is occurring in the neck portion and the base. Comparing the vacuum distortion areas of the container illustrated in the preferred embodiment with conventional containers, it will be noted that the container 70 of the preferred embodiment has less vacuum panel area than that of conventional PET hot fill containers. An additional distortion area in container 70 of the preferred embodiment occurs because of the formation of bulbous neck segment 81. Thus, bulbous neck segment 81 plus vacuum panels 83a plus the vacuum panel in base 78 provide sufficient flexibility for a 64 fluid ounce container to deflect under hot fill and subsequent vacuums such that body portion 77 is maintained sufficiently rigid so as not to undergo either radial contraction or longitudinal contraction even when the container is opened and its shape expands when the vacuum is released. Thus, the paper label remains on body sidewall 77 and special plastic labels or heavy duty paper applications do not have to be used.

Bulbous neck portion 81, as best shown in FIG. 5, is an essential part of container 70 and corresponds, at least in part, to the transition zone 53 of preform 26 which in turn was a critical part of the process and thus container geometry and processing requirements are interrelated in this area. Additionally, bulbous neck portion is subjected, by its configuration, to a thorough biaxial orientation in the blow molding step. More specifically, bulbous neck portion 81 comprises relative to mouth portion 72 a first radially outwardly extending arcuate surface 83a which blends into an "S" curve. The "S" curve in turn includes a second radially outwardly extending arcuate surface 85a followed by a third radially inwardly arcuate surface 86a. While various composite arcuate surfaces can be substituted for that disclosed, the general concept is that first arcuate surface (i.e. a concave surface 83a) is defined by first radius 84 and the reverse curve defined by surfaces 85a, 86a comprise arcuate surfaces defined by radius' 87, 88a respectively (i.e., basically a convex surface). First radius 84 significantly larger than second and third radius' 87, 88a and it assures that the transition zone of preform 26 has a good or thorough biaxial orientation in the blow mold. The reverse or "S" curve, on the other hand, is sized relative to first arcuate surface 83a to premit deflection at certain vacuum levels while maintaining some degree of rigidity. Importantly, by the configuration of the arcuate surfaces, deflection at first arcuate surface 83a is not especially significant. Third arcuate surface 86a is tangential to frusto-conical wall segment 80 which makes an angle of anywhere from about 45° to 75° relative to the vertical center line 79 of bottle 70. Preferably, the angle is approximately 60° and it is to be appreciated that when container 70 is capped and the vacuum is drawn, this angle would decrease but it will not be less than 45° so that container 70 can withstand vertical loads without deflection.

Vertical loading of container 70 occurs during warehousing, shipping and shelf display of container 70. Vertical loading is also imposed on container 70 when container 70 is capped. It is, of course, appreciated that container 70 is capped while the product fill is at an elevated temperature and that the stability, rigidity or strength of any PET container, not withstanding the crystallinity level, is reduced at elevated temperature. Conventional head capping mechanisms employed for glass bottles typically exert axial downward forces of as much as 70 or so pounds on the mouth portion of the bottle. Such force levels are unacceptable for PET containers with hot fill products. Accordingly, the prior art has reduced the downward capper forces and/or as redesigned closures and bottle configurations. For example, it is conventional to mold a lip into the container mouth so that the underside of the lip rests on a support during the capping operation to eliminate or substantially reduced axial loading on the container side walls. Such lip could easily be molded into container 70. When the lip is not used, and even when the lip is used, it is essential that mouth portion 72 maintain its fixed attitude relative to first arcuate surface 83a which coincidentally happens to include the transition zone 53 of preform 26. To assist in enhancing the rigidity of surface 83a not only for the purposes of maintaining mouth orientation during filling, but also to increase strength of surface 83a for stack loading and also for resisting vacuum deformation, an alternative embodiment is shown in FIGS. 8 and 9 where reference numerals previously used will designate like parts and portions of container 70. In FIGS. 8 and 9, a plurality of protrusions 90a are formed in first arcuate surface 83a. Preferably each protrusion 90a is in the form of a triangular gusset having a base 92 and an apex 93a. Base 92 is located at a line which defines the demarcation or transition point between the mouth portion 72 and bulbous neck segment 81, i.e. the beginning of transition zone 53. As best shown in FIG. 9, at this line, protrusion 90a is elevated somewhat above arcuate surface 83a and tapers into first arcuate surface 83a at its apex 93a just short of the transition between first arcuate surface 83a and second arcuate surface 85a. Preferably, six protrusions 91 are formed in first arcuate surface 83a at equal angular distances about mouth portion 72 and they function, as noted above, to prevent distortion or deflection of first arcuate surface 83a either from axial loads or from internal vacuum forces.

The invention has been described with reference to preferred and alternative embodiments. It will be obvious to those skilled in the art after reading and understanding the specifications hereof to make alterations and modifications to the process, container design or system disclosed herein. It is our intention to include all such alterations and modifications insofar as they come within the scope of the present invention.

It is thus the essence of our invention to provide a one stage process and a container configuration produced by the one stage process which results in an improved PET container suitable for use in hot fill applications.

We claim:

1. A thermally stable, vacuum compensable PET container suitable for hot fill applications comprising a generally amorphous threaded mouth portion and a highly crystallite cylindrical body portion extending from said mouth portion, said body portion having
   i) a generally frusto-conical neck portion extending from said mouth portion;
   ii) a generally cylindrical side wall portion extending from said neck portion;
   iii) a generally circular end wall portion extending from the opposite end of said generally cylindrical side wall portion;
   iv) vacuum distortion means in said neck portion and said end wall portion to permit container shrinkage when a vacuum is drawn into said container; and
   v) rigidizing means in said cylindrical side wall portion preventing radial and longitudinal movement of said side wall when said vacuum is drawn, said rigidizing means including a plurality of radially inwardly extending ring segments and a plurality of cylindrically shaped flat land segments, said radially inwardly extending ring segments longitudinally spaced from one another and contiguously interconnected by said cylindrically shaped flat land segments, said rigidizing means further including a leading land segment generally adjacent said frusto-conical neck portion and a trailing land segment generally adjacent said end wall portion whereby said trailing and leading land segments permit glued application of conventional thickness paper labels to said container while said land segments and said interconnecting ring segments rigidize said cylindrical side wall portion.

2. The container of claim 1 wherein each ring segment includes a first frusto-conical wall segment sharply extending from one end of a cylindrically shaped flat land segment, a second frusto-conical wall segment sharply extending from an end of an adjacent cylindrically shaped flat land segment, and an arcuate wall segment joining said first and second frusto-conical wall segments together at their intersection.

3. The container of claim 2 wherein said container has a longitudinally extending centerline about which said container is symmetrical, said frusto-conical wall segments extend radially inwardly toward the center of said bottle and form an angle of about 20° to 45° in a plane perpendicular to said longitudinally extending centerline.

4. The container of claim 1 further including bulbous means formed in said neck portion of said container adjacent said mouth portion for rigidizing said mouth portion relative said body portion while providing an additional contraction-expansion area to said container, said bulbous means including a radially outwardly extending first concave arcuate segment adjacent said mouth portion, and a second radially inwardly extending convex arcuate segment contiguous with and extending from said first arcuate segment to form a bulbous wall segment in said neck portion, said bulbous wall segment contractible under vacuum in the nature of a vacuum panel and strengthening means formed in said first concave arcuate segment to rigidize said mouth portion relative said body portion, said strengthening means including at least one protrusion formed in the shape of a gusset in said first arcuate concave segment whereby said mouth portion retains its attitude relative to said body portion during hot filling of said container.

5. The container of claim 4 wherein said neck portion has a frusto-conical wall segment extending from said second arcuate segment to said cylindrical side wall portion, said mouth portion has a cylindrical wall segment adjacent said neck portion, said protrusion is in the general shape of a triangle with the base of said triangle adjacent the intersection of said first arcuate segment and said cylindrical wall segment of said mouth portion, said triangle protruding above the surface of said first arcuate segment at its base and generally blending into said first arcuate segment at its apex.

6. The container of claim 5 wherein said second convex arcuate segment includes a first radially outwardly extending arcuate surface tangential to said first arcuate surface tangential to said first arcuate surface and to said frusto-conical wall segment whereby an "S" shaped, deflectable second concave segment results.

7. The container of claim 5 wherein a plurality of said protrusions are provided in equally spaced increments about said cylindrical wall segment of said mouth portion.

8. The container of claim 7 wherein said container is formed from a preform in a blow molding process, said preform having a cylindrical, threaded mouth opening, a closed end body portion in the shape of test tube, and a transition zone between said body portion and said mouth opening, said protrusion being formed in said transition zone of said preform.

* * * * *